L. J. MICKA.
COLLAR FOR DECOY DUCKS.
APPLICATION FILED APR. 26, 1909.
971,392.
Patented Sept. 27, 1910.
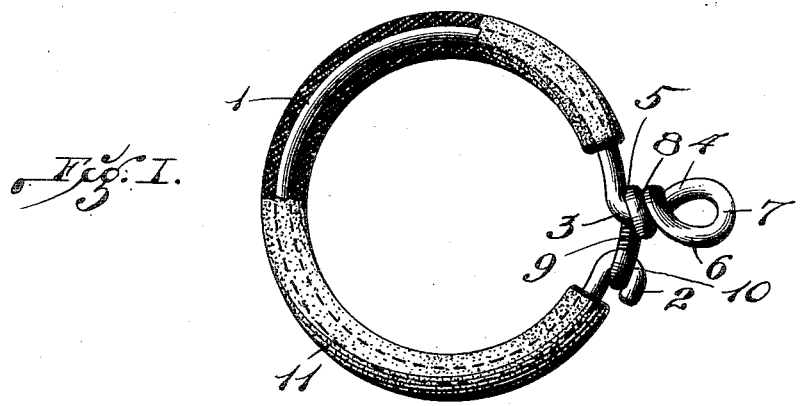
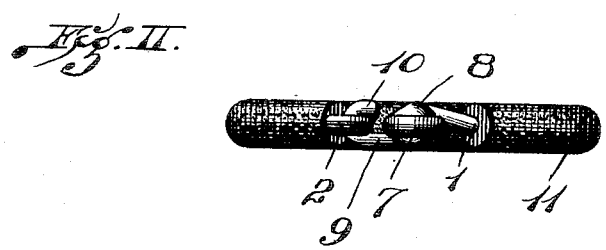
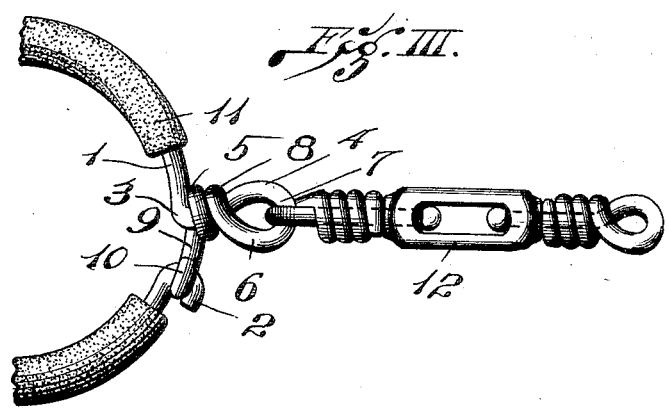
ATTEST.
INVENTOR.
LOUIS J. MICKA.
BY E. S. Knight ATTY.

UNITED STATES PATENT OFFICE.

LOUIS J. MICKA, OF ST. LOUIS, MISSOURI.

COLLAR FOR DECOY-DUCKS.

971,392.  Specification of Letters Patent.  Patented Sept. 27, 1910.

Application filed April 26, 1909. Serial No. 492,280.

*To all whom it may concern:*

Be it known that I, LOUIS J. MICKA, a citizen of the United States of America, residing at the city of St. Louis, in the State of Missouri, have invented certain new and useful Improvements in Collars for Decoy-Ducks, of which the following is a full, clear, and exact description, reference being had to the drawings forming part of this specification.

My invention relates to a collar for use in tethering live ducks when said ducks are used as decoys to attract wild ducks in order that the latter may be killed by sportsmen, and the invention has for its object the production of a collar of this description which is of a simple nature and may be readily and quickly applied to, or detached from, the neck of a duck, and which when in use will perform its office without liability of injury to the bird.

Figure I is in part an elevation and in part a section of my decoy duck collar on an enlarged scale for clearer illustration. Fig. II is an edge view of the collar. Fig. III is an elevation of fragments of the collar with a swivel attached thereto.

In the accompanying drawings: 1 designates the approximately circular body of the ring of my decoy duck collar which is formed of a single piece of wire, this body being provided at one end with an out-turned reverse hook 2. The other end of the wire body is bent outwardly at 3 so as to produce an outwardly extending arm 4 in which, adjacent to the ring portion of the body, is a curved seat 5. From the outer end of the arm 4, the wire is bent laterally and then inwardly to produce an inwardly extending arm 6 that leads to the outwardly extending arm 4. The inwardly extending arm crosses the outwardly extending arm, thereby producing an eye 7, and the wire is wrapped around the arm 4 to furnish a twist 8, of which the arms 6 and 4 are units, adjacent to the ring body 1.

9 is a hook arm extending from the twist 8 and which terminates in the hook 10 that is bent in a direction at right angles to the direction of the out-turned hook 2 at the opposite end of the wire body 1. There is a sufficient space between the twist 8 and the free end of the hook 10 to permit of the passage of the bow of the out-turned hook 2 between these members, and consequently when the two hooks 2 and 10 are brought together for the purpose of securing the collar around the neck of a live decoy duck, said hooks may be readily connected by the simple act of passing the bow of the hook 2 between the free end of the hook 10 and the twist 8. The collar may be readily and quickly opened by a reverse movement of the hook 2.

11 designates a sheath that is fitted to the ring of the wire body 1. This sheath, which is preferably a piece of rubber tubing, serves as a pliable covering for the ring of the collar, in order that the neck of the bird to which the collar is applied may not be injured by the ring.

In Fig. III, I have shown a swivel 12 attached to the eye 7 of the wire body of my collar, and to which the cord or other tether that is connected with the collar may be attached instead of being attached directly to the eye 7, in order that the tether may not become twisted with a result of shortening its length.

I claim:

A collar for a decoy duck consisting of a plain circular ring, adapted to fit around the neck of a duck, formed with an out-turned reverse hook at one end with an outwardly extending curved arm at the other end, having a lateral bend and an inwardly extending curved arm twisted around the outwardly extending curved arm so as to provide a short eye and with a hook arm, offset from the ring, and having an out-turned reverse hook at right angles to the reverse hook at the first named end.

LOUIS J. MICKA.

In the presence of—
O. A. PIER,
HENRY A. ASHOFF.